United States Patent [19]

Wehmeier

[11] Patent Number: 4,646,445

[45] Date of Patent: Mar. 3, 1987

[54] DEMONSTRATION DEVICE FOR SHOWING THE REQUIRED SIZES OF LENSES FOR EYEGLASSES

[76] Inventor: Reinhard Wehmeier, Bahnhofstrasse 12, D-4803 Steinhagen, Fed. Rep. of Germany

[21] Appl. No.: 811,394

[22] Filed: Dec. 20, 1985

[30] Foreign Application Priority Data

Dec. 22, 1984 [DE] Fed. Rep. of Germany ....... 3447119

[51] Int. Cl.⁴ .............................................. A61B 3/10
[52] U.S. Cl. ....................................... 33/507; 33/200; 33/28
[58] Field of Search ................ 33/200, 507, 568, 570, 33/573, 562, 28, 2 A

[56] References Cited

U.S. PATENT DOCUMENTS 3,457,652  7/1969  Moffett .
4,208,800  6/1980  Grolman et al. ...................... 33/200

FOREIGN PATENT DOCUMENTS

| 232293 | 7/1963 | Austria . | |
| 1051677 | 10/1954 | Fed. Rep. of Germany | .......... 33/28 |
| 928253 | 4/1955 | Fed. Rep. of Germany . | |
| 1160210 | 12/1963 | Fed. Rep. of Germany . | |
| 7026520 | 11/1970 | Fed. Rep. of Germany . | |
| 2851622 | 9/1979 | Fed. Rep. of Germany . | |
| 8222171 | 12/1982 | Fed. Rep. of Germany . | |
| 3217940 | 11/1983 | Fed. Rep. of Germany . | |
| 3043668 | 12/1983 | Fed. Rep. of Germany . | |
| 8430712 | 1/1985 | Fed. Rep. of Germany . | |
| 502716 | 3/1939 | United Kingdom | ..................... 33/28 |

Primary Examiner—Harry N. Haroian
Attorney, Agent, or Firm—Oblon, Fisher, Spivak, McClelland & Maier

[57] ABSTRACT

A demonstration device 10 for showing the required size of lenses for frames 44 comprises a base plate 12 with two horizontal guide slots 16 and a vertical guide slot 18. Two carriages 24, which in each case carry a circular template 28, are movable in the horizontal guide slots 16. The diameter of templates 28 correspond to the diameter of commercial blanks for eyeglass lenses. The distance between the centers of the templates 28 can be adjusted to the distance between the wearer's pupils by moving the carriages 24. A slide 32 is movable in the vertical guide slot 18. It has a leading edge 38 which supports the lower edge of the frame 44. The slide 32 is adjusted to correspond to the distance between the wearer's pupils and the lower edge of the frame 44. By overlapping between the templates 28 and the rims 48 of the frame 44, it is possible to see whether regular lenses or oversized lenses must be used.

10 Claims, 2 Drawing Figures

DEMONSTRATION DEVICE FOR SHOWING THE REQUIRED SIZES OF LENSES FOR EYEGLASSES

FIELD OF THE INVENTION

This invention relates to a demonstration device for showing the required sizes of lenses for eyeglasses.

BACKGROUND OF THE INVENTION

Lenses for optical eyeglasses are produced from circular blanks that are prepared industrially in certain standard sizes. The lenses are inserted in the frame so that the optical center (i.e., the geometric center of the original blank) is centered on the wearer's pupils. With modern frame shapes, it often happens that the maximum distance between the wearer's pupils and the rim of the frames is greater than the radius of the blank normally used In this case, so-called oversized lenses must be used. Such lenses are produced from blanks with larger diameter and therefore are more expensive than normal eyeglass lenses. However, many times this requirement is hard to explain to customers, since even in a frame that requires oversized lenses the surface enclosed by the rims of the frame seems comparatively small.

OBJECT OF THE INVENTION

The object of the invention is to provide a demonstration device that makes it possible to show to customers the need to use oversized lenses.

SUMMARY OF THE INVENTION

The foregoing object is achieved by a demonstration device having a base plate with two guide slots running crosswise aligned on a line and a single guide slot running lengthwise. Two carriages are movable in the guide slots running crosswise. A slide is movable in the guide slot running lengthwise. The slide has a leading edge running parallel to the guide slots running crosswise. A circular template is mounted on each of the carriages. The diameter of the circular templates corresponds to the diameter of blanks for lenses.

USE OF THE INVENTION

The demonstration device according to the invention is used as follows.

When a wearer has chosen a particular frame, the optician measures the distance from the center of the wearer's pupils to the lower edge of the rim of the frame. This can be accomplished, for example, with a measuring rod. The slide of the demonstration device is adjusted so that the measured distance coincides with the distance between the leading edge of the slide and a straight line through the centers of the two circular templates. The two carriages are adjusted so that the distance between the centers of the two templates is equal to the distance between the wearer's pupils. Then the frame is placed on the base plate so that the lower edge of the rim of the frame rests against the leading edge of the slide. The position of the templates, which symbolize the lens blanks, corresponds to a correct centering of the eyeglass lenses in relation to the frame and shows to the wearer the later fit of the lenses in the frame. If the rim openings of the frame are not completely covered by the templates, it is immediately clear to the wearer that larger blanks must be used for production of the lenses.

Preferably the templates are detachably mounted in preset positions on the carriages. This can be accomplished, for example, with pins projecting from the carriages. Each pin can engage in a central hole in one of the templates. However, preferably two pins on each carriage engaged in two off-center openings in each template.

The templates are preferably made from transparent sheets. In each case, the carriages are provided with a marking indicating the center of the template. On the guide slots running crosswise are provided length scales that are visible through the transparent templates and allow a quick adjustment to the distance between the pupils. Another length scale is placed perpendicular to the leading edge of the slide. This scale gives the distance to the straight line through the centers of the templates and thus facilitates adjustment of the slide.

DETAILED DESCRIPTION OF THE PRESENTLY PREFERRED EMBODIMENT

Figure 1:
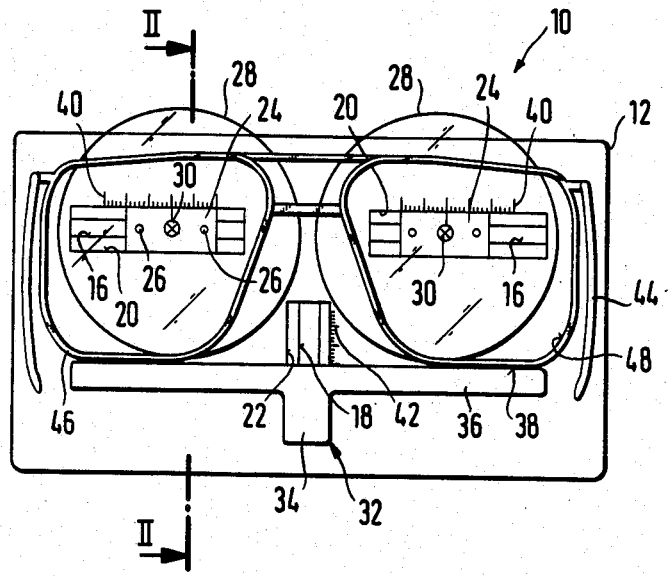
FIG. 1 shows a demonstration device according to the invention in a top view.
Figure 2:
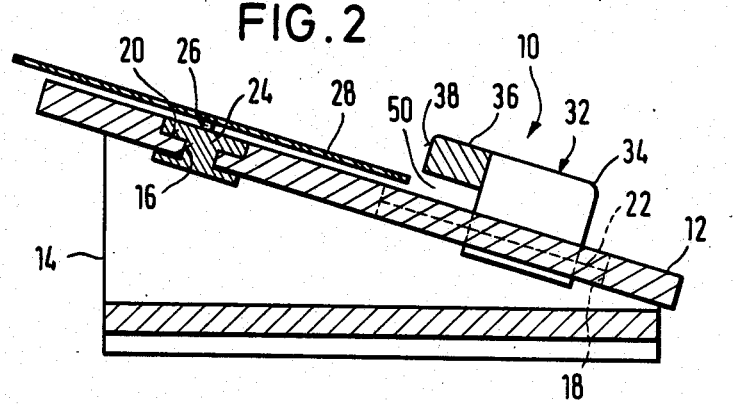
FIG. 2 is a section along line II—II of FIG. 1.

A demonstration device 10 according to the invention comprises a base plate 12 that is placed like a lectern on a foot 14. The base plate 12 has aligned on a straight line two guide slots 16 running crosswise (identified hereinafter as the horizontal guide slots 16) and a guide slot 18 running lengthwise (identified hereinafter as the vertical guide slot 18). Shallow grooves 20, 22 are provided on the lengthwise edges of the horizontal guide slots 16 and of the vertical guide slot 18, respectively.

A carriage 24 is guided in each horizontal guide slot 16. Each of the carriages 24 has an I-shaped cross section and is placed in a corresponding one of the grooves 22 so that its upper surface is aligned with the upper surface of the base plate 12. Two pins 26 project from the upper surface of each carriage 24. A circular template 28 made from transparent plastic sheet is provided with two openings for the pins 26. The templates 28 are mounted on the pins 26 so that their centers coincide with a marking 30 on each carriage 24.

In the vertical slot 18 and the grooves 22 is placed a T-shaped slide 32. The T-shaped slide 32 has a foot 34 extending parallel to the vertical guide slot 18 and a rail 36 extending parallel to the horizontal guide slots 16. The rail 36 has a leading edge 38. The shape of the cross section of the foot 34 coincides approximately with the shape of the cross section of the carriages 24. The undersurface 50 of the rail 36 is spaced from the upper surface of the base plate 12 so that the foot 34 is movable over the templates 28.

The carriages 24 are movable in the horizontal guide slots 16 so that the distance between the markings 30 can be adjusted to the distance between the wearer's pupils. Adjustment is faciliated by a length scale 40 on the edges of one of the grooves 20 associated with each horizontal guide slot 16. The T-shaped slide 32 is movable in the vertical guide slot 18 so that, with the aid of a scale 42, the distance between the leading edge 38 of the T-shaped slide 32 and a straight line through the center of the markings 30 can be adjusted to a value that corresponds to the measured distance between the wearer's pupils and the lower edge of a frame 44 having rims 48. The frame 44 is then placed on the base plate 12 so that the lower edges 46 of the rims 48 rest againt the leading edge 38 of the T-shaped slide 32.

The templates 28 correspond to the diameters of commercial blanks for lenses and show the positions in which the lenses are to be inserted into the frame 44. In the example shown, it can be clearly seen that the templates 28 do not completely cover the openings of the rims 48 of the frame 44. In this way the wearer is shown that larger blanks must be used to form his or her lenses.

The templates 28 can be removed from the pins 26 and replated with larger templates corresponding to larger lens blanks.

In a modified embodiment, the templates 28 are connected solidly to the carriages 24. In this case, the carriages 24 have a T-shaped cross section so that the carriages 24 can be taken out of the horizontal guide slot 16 to change the templates 28.

While in the embodiment show the T-shaped slide 32 is guided in a single vertical guide slot 18, in another embodiment several vertical guide slots can be provided for the T-shaped slide 32, thereby avoiding tilting of the T-shaped slide 32.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A demonstration device for showing the required sizes of lenses for eyeglasses, said device comprising:
   (a) a base plate having two first guide slots aligned on a straight line and at least one second guide slot running perpendicular to said two first guide slots;
   (b) two carriages, one of said two carriages being movable in each of said two first guide slots;
   (c) a slide that is movable in said at least one second guide slot, said slide having a leading edge running parallel to said two first guide slots;
   (d) at least two templates that correspond in size and shape to blanks for eyeglasses; and
   (e) means for mounting one of said at least two templates on each of said two carriages.

2. A demonstration device as recited in claim 1 wherein said at least two templates are detachably mounted in preset positions on said carriages.

3. A demonstration device as recited in claim 2 wherein said at least two templates are detachably mounted on said carriages by pins that extend through holes in said templates.

4. A demonstation device as recited in claim 3 wherein said pins extend through holes placed off-center in each of said templates.

5. A demonstration device as recited in claim 1 wherein said at least two templates are formed from a transparent sheet.

6. A demonstration device as recited in claim 1 wherein at least two second guide slots are provided for guiding of said slide.

7. A demonstration device as recited in claim 1 wherein:
   (a) grooves are provided along the edges of said two first guide slots and
   (b) said grooves receive the upper areas of said two carriages in such a way that said two carriages are aligned with the surface of said base plate.

8. A demonstration device as recited in claim 1 wherein:
   (a) length scales are provided adjacent to said two first guide slots and
   (b) each of said two carriages has a marking in the position corresponding to the center of the corresponding one of said at least two templates.

9. A demonstration device as recited in claim 1 wherein said at least two templates are circular.

10. A demonstration device as recited in claim 1 comprising a plurality of pairs of templates, each of said plurality of pairs of templates corresponding in size and shape to different blanks for eyeglasses.

* * * * *